United States Patent Office 3,394,214
Patented July 23, 1968

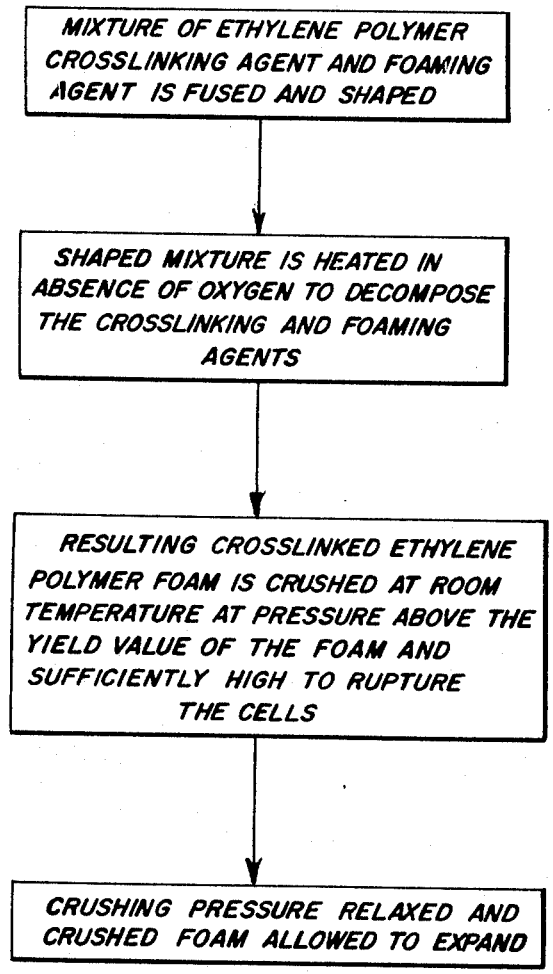

3,394,214
METHOD OF INCREASING THE TENSILE STRENGTH OF A CROSSLINKED ETHYLENE POLYMER BY COMPRESSION
Calvin J. Benning, Clarksville, Md., assignor to W. R. Grace & Co., New York, N.Y., a corporation of Connecticut
Filed Aug. 10, 1964, Ser. No. 388,686
2 Claims. (Cl. 264—321)

ABSTRACT OF THE DISCLOSURE

A crosslinked ethylene polymer foam, produced by heating in the absence of oxygen a fused shaped mixture of ethylene polymer, crosslinking agent and foaming agent, is crushed at room temperature. The crushing pressure is of sufficient magnitude to exceed the yield value of the foam and to rupture the cells of the foam. The pressure is then relaxed and the crushed foam is allowed to expand.

This invention relates to the modification of the properties of foam, and is particularly directed to modified foams foamed from ethylene polymers.

In applications for U.S. Patent by Calvin J. Benning and Ronald Adams, Ser. Nos. 367,615 and 368,972, filed May 15, 1964 and May 20, 1964 respectively, now abandoned, assigned to the assignee of this application, a process was disclosed which produced crosslinked foams from both high- and low-density polyethylenes and ethylenic co- and graft-polymers. Essentially the process consists of making a uniform powdered mixture of the base resin, a crosslinking agent, and a foaming agent, then fusing the mixture into a solid mass at a fusion temperature below the decomposition temperature of either of the agents, then shaping the fused mass. Subsequent to the fusing and shaping operation, the mass is exposed to a temperature sufficiently high to decompose both the crosslinking and the foaming agent. This operation takes place in a heated space from which oxygen is rigidly excluded. Foams manufactured by the process above described usually have a microporous surface skin of from 1–2 mils thick. Beneath this skin, a very uniform structure exists made up of cells of quite small size, usually from 6 to much less than 1 mil in diameter. When the base resin is high-density polyethylene, the foams are stiff board-like materials and will not elongate under stress.

The drawing sets forth a flow diagram of the claimed process.

I have found that it is possible to produce material having the flexibility and superficial appearance of artificial leather, by crushing at pressures above the yield value of the foam and at pressures sufficiently high to rupture the cells. The crushed material becomes sufficiently flexible to be used as an interlining or as flexible insulation, and for many other analogous uses. Roll crushing at a roll setting of less than 25% of initial thickness is effective.

Example I

A leather-like product is made in the following manner:
A copolymer of ethylene and butene-1, density 0.95, melt index 5 (Grex 50–0500) is blended with 3 weight percent of azobisformamide and 0.3% of 2,5-dimethyl-2,5 ditertiary butyl peroxy hexyne (Lupersol 130) and 2% of zinc stearate.

The mixture was molded into a plaque between the platens of a press maintained at 280° F. The molding cycle was six minutes. At the end of the cycle, the plaque was transferred to an oven, heated to 347° F. A nitrogen atmosphere was maintained in the oven. The foam which resulted had an apparent density of 0.135. Slabs 0.125 inch in thickness of this foam were cut on a skiving machine. The slabs were passed through a two-roll calender set at 0.015 inch. After passing through the calender, the material recovered to 0.030 inch thickness. The material has the feel and appearance of artificial leather.

Physically, the change brought about was as follows:

|  | Before crushing, p.s.i. | After crushing, p.s.i. |
| --- | --- | --- |
| Modulus at 1% | 2,028 | 2,427 |
| Stress at yield | 86 | 109 |
| Elongation at yield | 72 | 107.8 |
| Elongation at failure | 88 | 126 |
| Tensile strength | 80 | 109 |

Example II

A high-density graft copolymer of polyethylene and maleic diester prepared by grafting a polyethylene homopolymer having a density of 0.950 and a high load melt index (ASTM—D1238–57T.) of 1.8 to 3.25 with dibutyl maleate. The grafted product had a density of 0.948. Its melting point was 116 to 117° C. and melt index 3. It contained 7.7% by weight of dibutyl maleate.

This material in finely divided form was blended with 3 weight percent of azobisformamide and 0.7 weight percent of 2,5-dimethyl-2,5 ditertiary butyl peroxy hexyne. The mixture was molded in a circular die, 10½ inches in diameter at 400° F., at a pressure of 70 tons on the ram of the press. At the end of 6 minutes at this temperature, the ram was dropped and the material foamed, producing a foam having an apparent density of .186. The percentage of gel was determined to be 84.5.

Slabs of this material, 0.10 of an inch thick, were cut from the molded mass on a skiving machine. The slabs were passed through a 2-roll calender having a roll setting of .015 inch. After passing through the calender, the material expanded to .026 inch in thickness. The crushed material was extremely flexible and possessed the hand and feel of a finished calfskin.

Example III

A homopolymer of ethylene, density 0.96, melt index 5, was mixed with 3 weight percent of azobisformamide and 0.3 weight percent of 2,5-dimethyl-2,5 ditertiary butyl peroxy hexyne in an intensive mixer of the Banbury type. The molten mixture was immediately transferred to a pre-heated mold maintained at 400° F., having a ½-inch cavity of 10½-inch diameter. The amount of molten mix completely filled the mold cavity. The press was then closed at a ram pressure which produced 2000 p.s.i. At the end of 6 minutes the mold was opened and a foamed mass leaped out which expanded to a 1-inch thick disc, 20 inches in diameter. The percentage of gel as determined by gel extraction (20-hour extraction in boiling xylene) was 56%. The apparent density of the foam was 0.14. The foam was relatively stiff.

The foamed material, after cooling, was cut on a skiving machine into sheets of ⅛ and ¹⁄₁₆ of an inch in thickness. The sheets at atmospheric temperatures were subsequently run through a roll calender with a gap setting of 15 thousandths of an inch when the ¹⁄₁₆ material was passed through, and approximately 25 thousandths of an inch when the ⅛ inch material was passed through. These settings exerted pressures which exceeded the yield value of the foam. After crushing, the ⅛ inch material expanded to .0625 inch, and the ¹⁄₁₆ inch material expanded to .023. The thin material had a hand and feel very much resembling suede upper leather. The thicker material was extremely soft and pliable, but did not exhibit a "drape."

The reasons for this startling change in the properties of a cross-linked foam are not well understood. That a purely mechanical treatment at room temperature should turn a comparatively stiff, boardy foam into a soft, leather-like material with increased tensile strength is wholly unexpected. A partial explanation may be that in the absence of compression, the individual air cells in the foam act in a manner similar to that of solid aggregates bound in a matrix, and that when the cells are ruptured by the crushing force, their reinforcing effect disappears. However, the crushing force does not disrupt the crosslinked micro-structure of the polymer.

Materials which behave in this manner include branched, low-density i.e. about .910 to about .925, polyethylenes; medium density materials; and especially the linear high-density, about .950 to .960, polyethylenes. Oxidized homopolymers of ethylene, grafted polymers of ethylene, i.e. grafts of ethylene polymer and maleic diesters, and ethylene copolymers obtained by reacted ethylene with a comonomer such as propylene, butene-1, 3-methyl butene-1, pentene-1, hexyne-1, and 1,3-buta diene and the like, as well as mixtures of such comonomers.

The crushed material is strong and easily can be formed into interliners, plumper stock for shoes, flexible tape installation, and a great variety of other uses, products where flexibility, lack of water absorption, and relative chemical inertness are required.

I claim:

1. Process of modifying crosslinked, ethylene polymer foams to produce flexible sheets with increased tensile strength, said foams being produced by heating a fused shaped mixture of ethylene polymer, crosslinking agent and foaming agent in the absence of oxygen to decompose said agents, which includes crushing a sheet of said foamed crosslinked ethylene polymer at room temperature, said crushing being of sufficient magnitude to exceed the yield value of the foam, and to rupture the cells of the foam, relaxing the pressure and allowing the crushed sheet to expand, thereby producing a soft, flexible sheet.

2. Process of claim 1, wherein the foamed sheet is passed between calender rolls, and wherein the distance between the roll is set to less than ¼ of the initial thickness of the sheet.

References Cited

UNITED STATES PATENTS

| | | | |
|---|---|---|---|
| 1,045,234 | 11/1912 | Willis et al. | 264—321 XR |
| 3,300,558 | 1/1967 | Grant et al. | 264—321 |
| 2,744,291 | 5/1956 | Stastny et al. | 264—53 |
| 2,813,053 | 11/1957 | Tuomala. | |
| 3,063,953 | 11/1962 | Eberl et al. | 260—2.5 |
| 3,082,483 | 3/1963 | Bickford | 264—321 |
| 3,098,831 | 7/1963 | Carr | 260—2.5 |
| 3,098,832 | 7/1963 | Pooley et al. | 260—2.5 |

OTHER REFERENCES

Blair, E. A.: "Cell Structure and Physical Properties of Elastomeric Cellular Plastics," Resinography of Cellular Plastics, ASTM, STP 414, Am. Soc. Testing Mats., 1967, pp. 84–95.

JAMES A. SEIDLECK, *Primary Examiner.*

P. E. ANDERSON, *Assistant Examiner.*